(12) United States Patent
Huff et al.

(10) Patent No.: US 8,667,787 B2
(45) Date of Patent: Mar. 11, 2014

(54) COMPRESSED AIR ENGINE

(75) Inventors: Christopher M. Huff, Reeds, MO (US); Danny Lee Block, Reeds, MO (US)

(73) Assignee: HB Spider LLC, Reeds, MO (US)

(*) Notice: Subject to any disclaimer, the term of this patent is extended or adjusted under 35 U.S.C. 154(b) by 932 days.

(21) Appl. No.: 12/817,122

(22) Filed: Jun. 16, 2010

(65) Prior Publication Data
US 2011/0308382 A1    Dec. 22, 2011

(51) Int. Cl.
*F01B 1/04*    (2006.01)

(52) U.S. Cl.
USPC .......................................................... 60/409

(58) Field of Classification Search
USPC ........................................... 60/407, 409, 410
See application file for complete search history.

(56) References Cited

U.S. PATENT DOCUMENTS

| | | | |
|---|---|---|---|
| 3,765,180 A | 10/1973 | Brown | |
| 3,925,984 A | 12/1975 | Holleyman | |
| 4,018,050 A | 4/1977 | Murphy | |
| 4,124,978 A * | 11/1978 | Wagner | 60/410 |
| 4,292,804 A | 10/1981 | Rogers, Sr. | |
| 4,309,620 A * | 1/1982 | Bock | 290/4 R |
| 4,311,917 A * | 1/1982 | Hencey et al. | 290/1 A |
| 4,596,119 A * | 6/1986 | Johnson | 60/407 |
| 5,309,713 A | 5/1994 | Vassallo | |
| 5,415,245 A * | 5/1995 | Hammond | 180/165 |
| 5,491,977 A | 2/1996 | Cho et al. | |
| 5,515,675 A * | 5/1996 | Bindschatel | 60/407 |
| 5,695,430 A * | 12/1997 | Moyer | 477/189 |
| 6,006,519 A | 12/1999 | Hormell, Jr. | |
| 7,315,089 B2 | 1/2008 | Lambertson | |
| 7,828,091 B2 * | 11/2010 | Wedderburn et al. | 180/2.2 |
| 2009/0266069 A1 * | 10/2009 | Domes | 60/409 |

OTHER PUBLICATIONS

Wikipedia.com article "Compressed-air engine", http://en.wikipedia.org/wiki/Compressed-air_engine, downloaded Jun. 16, 2010.
HowStuffWorks.com article "How the Air Car Works", http://auto.howstuffworks.com/fuel-efficiency/vehicles/air-car.htm/printable, printed Jun. 16, 2010.
Greencar.com article "Trends: Air Powered Cars", http://www.greencar.com/articles/trends-air-powered-cars.php, printed Jun. 16, 2010.

* cited by examiner

*Primary Examiner* — Thomas E Lazo
(74) *Attorney, Agent, or Firm* — Martin & Associates, LLC; Derek P. Martin (57) ABSTRACT

An air engine system includes a motor coupled to the drive shaft of an air engine to control the speed of the air engine. The air engine uses compressed air from a compressed air source provided by an air compressor. The air engine may be used on a vehicle, providing a clean environmentally-friendly means of locomotion.

13 Claims, 6 Drawing Sheets

COMPRESSED AIR ENGINE

BACKGROUND

1. Technical Field

This disclosure generally relates to engines, and more specifically relates to compressed air engines.

2. Background Art

Engines that run off compressed air (air engines) have been around for more than a century. While some have been used is specialized applications, various technical challenges have prevented their widespread use in a variety of different applications. One such challenge is controlling the speed of an air engine. Many schemes have been proposed to control the speed of an air engine. Most vary the air flow and air pressure input to the engine to vary the speed of the engine. Some of these schemes require two different stages of air compression and accelerator valves that increase the complexity and cost of the system.

BRIEF SUMMARY

An air engine system includes an electric motor coupled to the drive shaft of an air engine to control the speed of the air engine. An accelerator controls the speed of the electric motor, which in turn controls the speed of the air engine. The air engine uses compressed air from a compressed air source provided by an air compressor. The air engine may be used on a vehicle, providing a clean environmentally-friendly means of locomotion.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

An air engine system includes a motor coupled to the drive shaft of an air engine to control the speed of the air engine. The air engine uses compressed air from a compressed air source provided by a battery-driven air compressor. The speed of the motor is controlled by an accelerator input to a speed controller. The speed of the motor determines the speed of the air engine. The air engine may be used on a vehicle, providing a clean environmentally-friendly means of locomotion.

Figure 1:
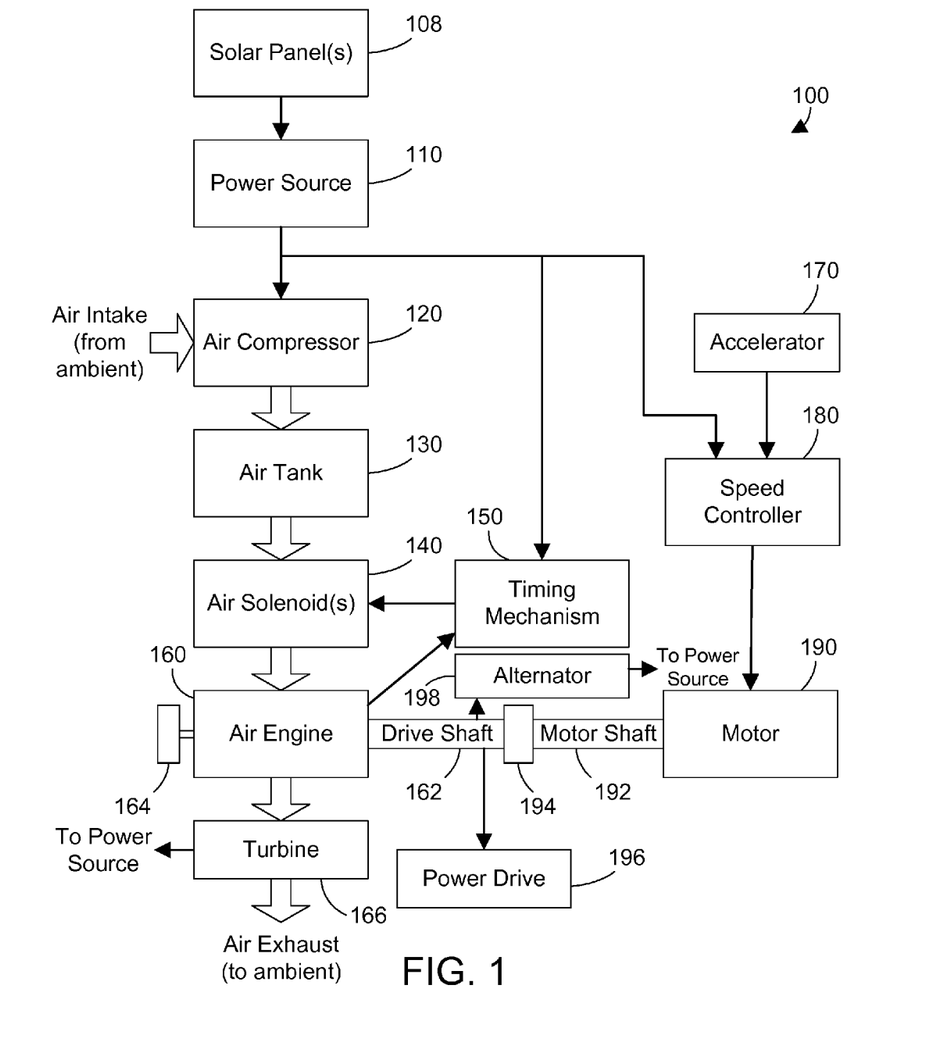
FIG. 1 is a block diagram of an air engine system.

Referring to FIG. 1, an air engine system 100 includes a power source 110 that powers an air compressor 120. The power source 110 is preferably a direct current (DC) power source that is provided by one or more batteries, such as deep-cycle vehicle batteries. The air compressor 120 receives ambient air at its intake and outputs compressed air at its output to an air tank 130. The air tank 130 is a storage receptacle for the compressed air provided by the air compressor 120. Air from the air tank 130 is provided to one or more air solenoids 140. Each air solenoid is an electrically-actuated air gate that is controlled by a timing mechanism 150. When actuated by the timing mechanism 150, the air solenoid provides the compressed air in the air tank 130 to an intake of an air engine 160. The air engine 160 receives the compressed air input from the air solenoid 140, and uses the compressed air to convert the energy in the compressed air to drive a drive shaft 162. Because there is no combustion in the air engine 160, the exhaust from the air engine is air that may be exhausted to ambient with zero hydrocarbon emissions.

The timing mechanism 150 actuates the air solenoid(s) 140 according to the state of the air engine 160. The timing mechanism 150 may be mechanically operated, may be an electronic timing mechanism, or may be any suitable combination of mechanical and electronic mechanisms. The timing mechanism 150 actuates the air solenoid(s) 140 to provide compressed air into the air engine 160 at the appropriate points in time to provide power strokes to the air engine 160. More details regarding the timing mechanism 150 are provided below.

The air engine 160 drives a drive shaft 162. The drive shaft 162 provides power drive 196 to provide mechanical work. If the air engine system 100 is used in a vehicle, the power drive 196 would typically include a transmission and differential that provides power to two or more of the wheels of the vehicle.

The drive shaft 162 of the air engine 160 is coupled to a motor shaft 192 of an electric motor 190 using a suitable coupler 194. The electric motor 190 is preferably a direct current (DC) motor. The coupler 194 could be a rigid coupler or could be a flexible coupler, such as a universal joint. In one specific implementation, the air engine 160 and motor 190 are positioned so the drive shaft 162 and motor shaft 192 are aligned along their longitudinal axes so they can be directly coupled with coupler 194. In an alternative implementation, the coupler 194 could be a gear on the drive shaft 162 that is coupled via a chain to the motor shaft 192 of motor 190. In addition, the coupler 194 could include suitable means for increasing or reducing the rotational speed of the drive shaft and/or motor shaft, such as a gearbox. The coupler 194 extends to any suitable way to mechanically couple the drive shaft 162 to the motor shaft 192 such that the speed of the motor shaft 192 controls the speed of the drive shaft 162.

The motor 190 is driven by a speed controller 180 coupled to an accelerator 170. The speed controller 180 sets the speed of the motor 190 according to the state of the accelerator 170. The accelerator 170 allows an operator of the air engine system 100 to increase or decrease the speed of the air engine 160 by changing the state of the accelerator 170, which causes the speed controller 180 to drive the motor 190 to a desired speed. In one suitable implementation, the accelerator 170 is a variable resistor, and speed controller 180 drives the motor 190 with a speed that corresponds to the resistance of the variable resistor. The accelerator 170 and speed controller 180 extend to any suitable way to determine the speed of the motor 190.

The air engine system 100 may include optional components, which include one or more solar panels 108, a flywheel 164, an alternator 198, and an air turbine 166. The solar panel(s) 108 are used to charge the power source 110. The flywheel 164 is used to store energy from the engine so the engine can maintain its speed over varying loads. The alternator 198 is powered by the drive shaft 162 to charge the power source 110. The air turbine 166 is placed in the path of the air exhaust from the air engine 160, and converts the energy from the exhaust exiting the air engine into rotational energy that is converted to electricity to charge the power source 110. The solar panel(s) 108 and air turbine 166 will extend the operating time of the air engine system 100 by providing additional energy to the power source 110.

Figure 2:
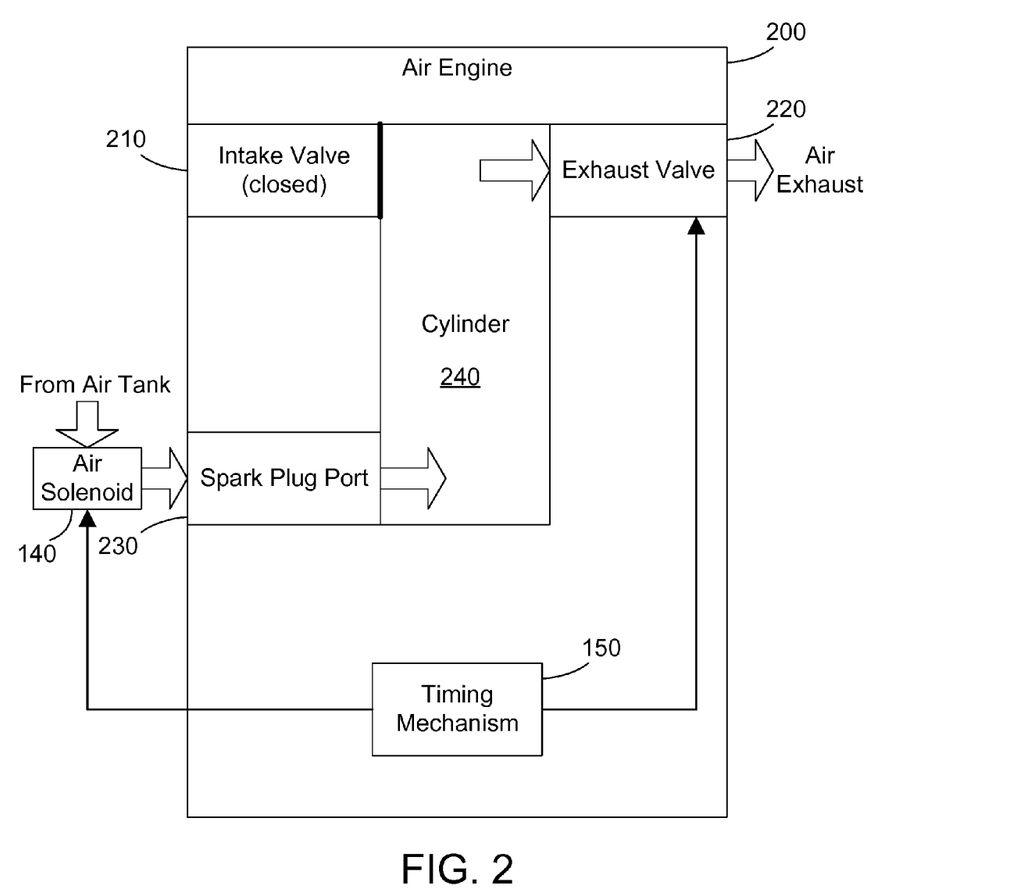
FIG. 2 is a block diagram of a first specific implementation of the air engine in FIG. 1.

One suitable implementation for the air engine 160 in FIG. 1 is shown in FIG. 2. Air engine 200 inputs air from the air solenoid 140 to the spark plug port 230 of the air engine. In this specific implementation, the air engine 200 is an internal combustion engine that has been converted to operate on compressed air without any internal combustion at all. Because there is no combustion in the air engine 200, the spark plug is not needed. The intake valve 210 is closed. One way to assure the intake valve remains closed at all times is to remove the lobe on the camshaft that would normally open the intake valve. The timing mechanism 150 actuates the air solenoid 140 at the appropriate time to provide compressed air through the air solenoid 140 through the spark plug port 230 into the cylinder 240. The timing mechanism preferably actuates the air solenoid 140 when a piston in the cylinder 240 is at or near top dead center. As a result, the compressed air pushes the cylinder downward, providing the power stroke of the air engine. The exhaust valve 220 opens to vent the air exhaust from the cylinder 240. Because there is no combustion in the cylinder, the timing mechanism 150 may actuate the air solenoid with each cycle of the piston, and may actuate the exhaust valve 220 on each cycle of the piston as well, which means every stroke of the piston is a power stoke in the air engine 200. One suitable way to actuate the exhaust valve 220 on each cycle of the piston is to modify the camshaft that actuates the exhaust valve 220 to include dual lobes. In this manner the exhaust valve 220 will open at the appropriate time during each cycle of the piston instead of on every other cycle of the piston. While air engine 200 in FIG. 2 is shown to include a single air solenoid 140, intake valve 210, exhaust valve 220, spark plug port 230, and cylinder 240, one skilled in the art will recognize these will be replicated in an engine according to the number of cylinders.

Figure 3:
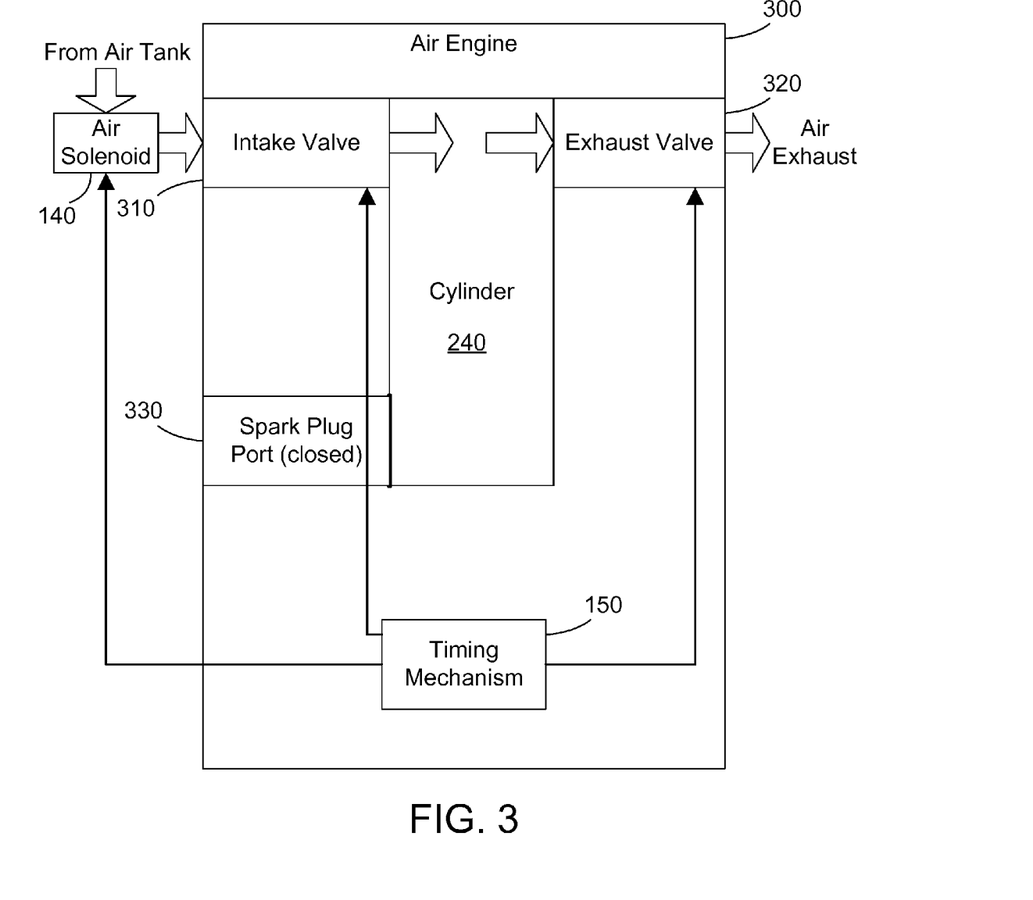
FIG. 3 is a block diagram of a second specific implementation of the air engine in FIG. 1.

An alternative implementation for the air engine 160 in FIG. 1 is shown in FIG. 3. In air engine 300, the air solenoid 140 inputs compressed air from the air tank into the intake valve 310 of the air engine. The spark plug port 330 is closed. One suitable way to plug the spark plug port is to leave a spark plug in place unconnected to any ignition wire. Another suitable way is to use a plug with the same threads as on a spark plug. Air engine 300 has some similarities to air engine 200 in FIG. 2. The timing mechanism 150 preferably actuates the intake valve 210 and exhaust valve 320 on each cycle of the piston, creating a power stroke on each cycle. One way for the timing mechanism 150 to actuate the intake valve 310 and exhaust valve 320 on each stroke is to modify the camshaft to provide dual lobes for the intake valve and dual lobes for the exhaust valve. Of course, the timing mechanism 150 could be electronic as well.

Figure 4:
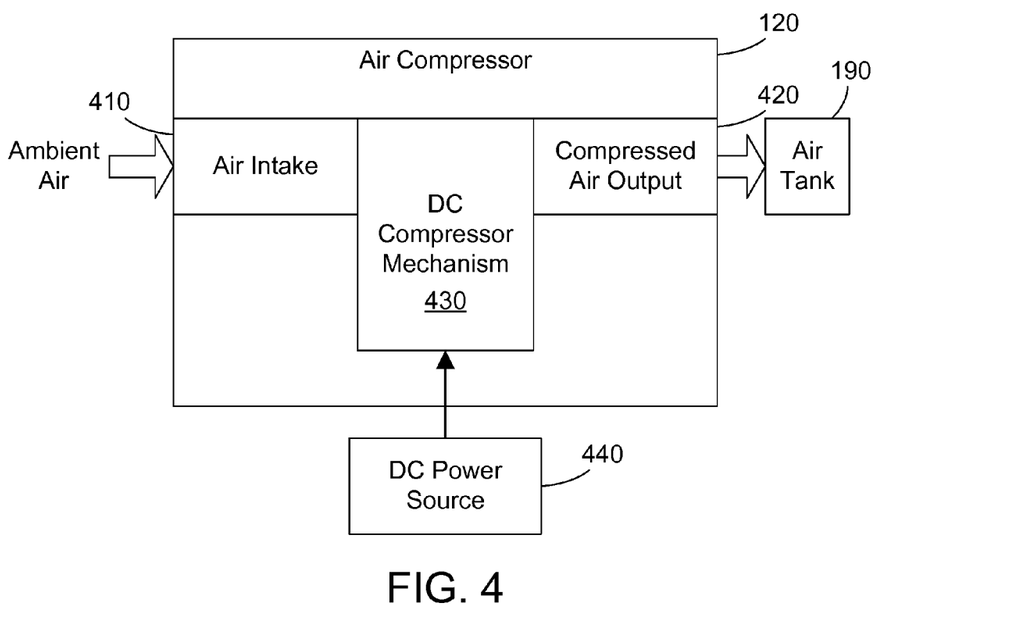
FIG. 4 is block diagram of one specific implementation of the air compressor in FIG. 1.

One suitable implementation of the air compressor 120 in FIG. 1 is shown in FIG. 4. Air compressor 120 includes an air intake 410 that receives ambient air, and inputs the ambient air to a direct current (DC) compressor mechanism 430 that is powered by a DC power source 440, which is one suitable implementation for the power source 110 in FIG. 1. The DC compressor mechanism 430 outputs the compressed air to its compressed air output 420, which is coupled to the air tank 190. One suitable implementation for DC power source 440 is one or more deep-cycle batteries such as those used on recreational vehicles.

Figure 5:
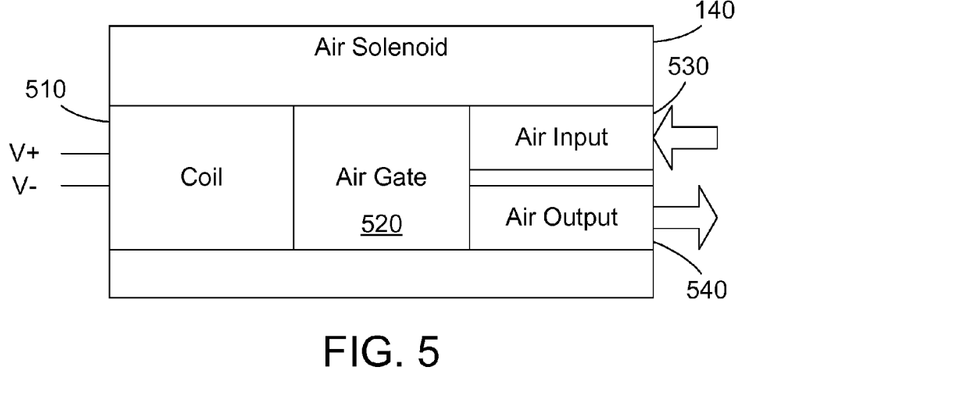
FIG. 5 is a block diagram of one specific implementation of the air solenoid in FIG. 1.

Details of one suitable implementation for the air solenoid 140 shown in FIG. 1 are disclosed in FIG. 5. The air solenoid 140 preferably includes a coil 510 that receives an electrical input that actuates an air gate 520. When a voltage is supplied to the coil 510, the air gate actuates to connect the air input 530 to the air output 540. When the voltage is removed from the coil 510, the air gate closes to disconnect the air input 530 from the air output 540. The air solenoid is thus an electrically-controlled air switch that is turned on and off by the timing mechanism 150 to provide compressed air to the air engine at the desired times. While the air solenoid described above is normally closed and opens the air gate when a suitable voltage is connected to the coil, a normally open air solenoid could alternatively be used that closes the air gate when a voltage is connected to the coil, provided the timing mechanism 150 provides the appropriate voltage to the coil at the appropriate time.

Figure 6:
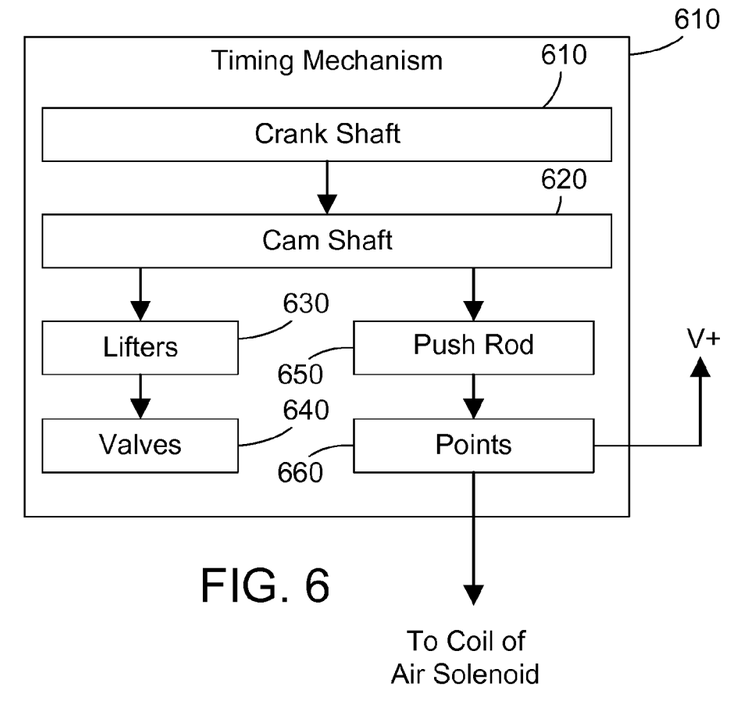
FIG. 6 is a block diagram of a first specific implementation for the timing mechanism in FIG. 1.

One suitable implementation for the timing mechanism 150 is shown in FIG. 6. The timing mechanism 600 includes a crank shaft that turns a cam shaft via a timing belt or chain. The cam shaft includes lobes that actuate lifters 630 that mechanically open and close the valves 640 as the cam shaft 620 turns. The cam shaft 620 also actuates a push rod 650 that actuates points 660. The points 660 supply a voltage V+ to the coil of the air solenoid, thereby injecting compressed air into the air engine at a time determined by the points 660. In a multiple-cylinder engine, the push rod 650 would be replaced by a distributor driven by cam shaft 620 that drives points 660 to drive the air solenoids for all of the cylinders at the appropriate times.

Figure 7:
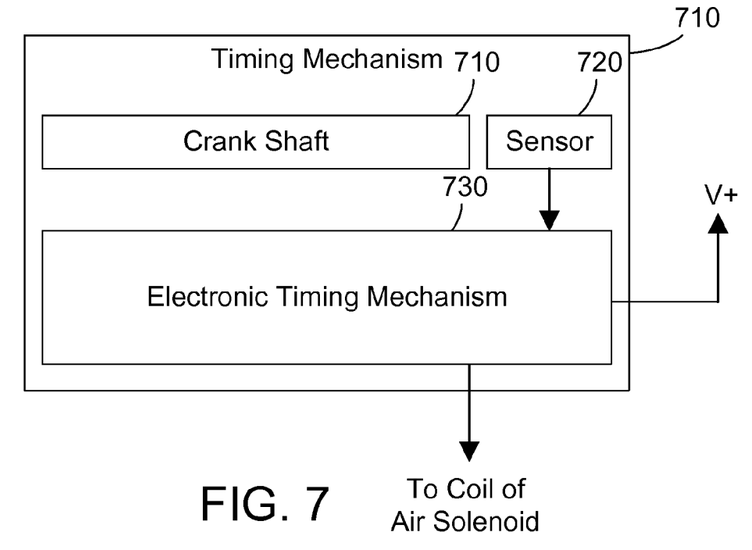
FIG. 7 is a block diagram of a second specific implementation for the timing mechanism in FIG. 1.

A second suitable implementation for the timing mechanism 150 is shown in FIG. 7. The timing mechanism 700 includes a sensor 720 that detects rotation of the crank shaft 710. The sensor supplies a signal to an electronic timing mechanism 730, which in turn supplies the drive signal to the coil of the air solenoid(s). Note for air engines that include multiple cylinders, the sensor 720 could sense different positions of the crank shaft 710 to signal to the electronic timing mechanism 730 when to actuate each air solenoid for each cylinder. In the alternative, the sensor 720 could sense a single position of the crank shaft 710 to the electronic timing mechanism 730, which could then generate the appropriate timing signals to the coils of all air solenoids in sequence, thereby driving all cylinders of a multiple-cylinder engine while sensing only one position of the crankshaft.

Note the timing mechanism 150, whether mechanical, electronic, or some combination of the two, may include a timing adjustment mechanism that alters the timing for actuating the air solenoids as the speed of the engine changes. In older internal combustion engines, a vacuum advance on the distributor adjusts the timing as engine speed increases. In newer internal combustion engines that include electronic ignition, the firing of the spark plugs is adjusted electronically according to the sensed speed of the engine. Either of these mechanisms could be used to adjust the actuation of the air solenoid(s) as the speed of the air engine changes. The timing mechanism 150 expressly extends to any suitable means for altering the timing of the actuation of the air solenoid(s) as the speed of the air engine changes.

Figure 8:
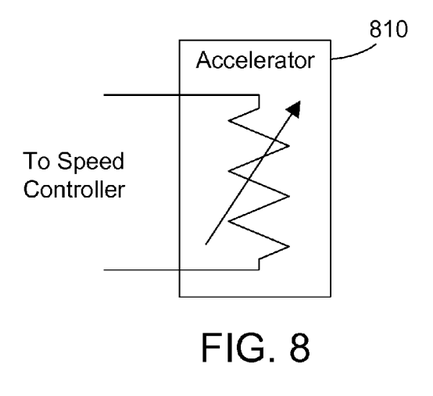
FIG. 8 is a block diagram of one specific implementation for the accelerator in FIG. 1.

One suitable implementation for the accelerator 170 in FIG. 1 is shown in FIG. 8. The accelerator 810 is a suitable variable resistor (or rheostat) coupled to the speed controller. The speed controller in this implementation varies the speed of the motor 190 according to the resistance of the accelerator 810. When the air engine system 100 is used in a vehicle, the accelerator 170 is preferably a variable resistor with a linear plunger that allows a foot pedal to be coupled to the linear plunger such that when the driver of the vehicle presses the pedal, the resistance changes to increase the speed of the motor, and when the driver of the vehicle takes the foot off the pedal, a spring returns the linear plunger to its undepressed position, which corresponds to a resistance that causes the motor to run the air engine at an idle speed. In this manner, a linear variable resistor can function in similar fashion to know accelerator pedals in known vehicles.

Figure 9:
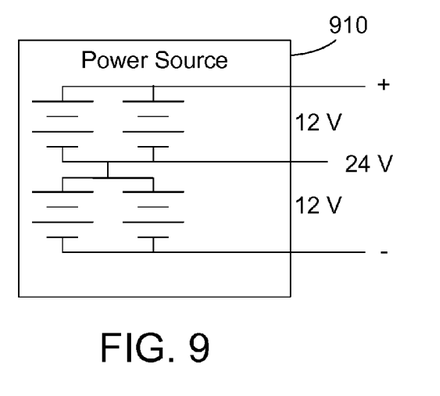
FIG. 9 is a block diagram of one specific implementation for the power source in FIG. 1.

One suitable implementation for the power source 910 is shown in FIG. 9 to include four 12 volt deep-cycle batteries, similar to those used in recreational vehicles. In the specific configuration shown in FIG. 9, two are connected in parallel, the other two are connected in parallel, and the two sets are then connected in series. This provides two sources of 12 volt DC power, along with 24 volt DC power.

Figure 10:
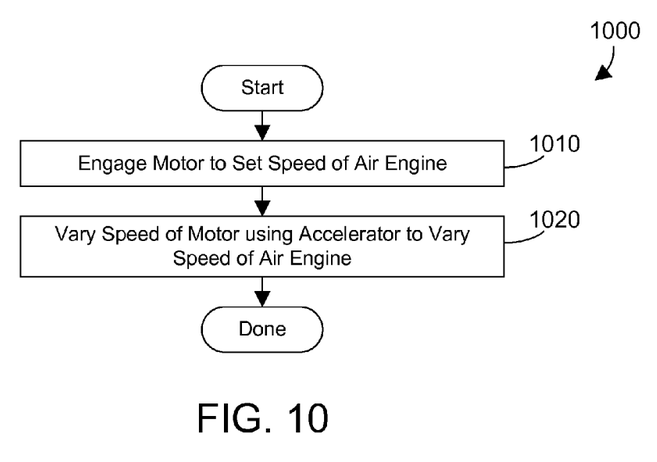
FIG. 10 is a flow diagram of a method for operating the air engine system in FIG. 1.

Referring to FIG. 10, a method 1000 for operating the air engine begins by engaging the motor to set the speed of the air engine (step 1010). The rotation of the air engine causes the timing mechanism 150 to actuate the air solenoid(s) 150, which causes the air engine 160 to run at the speed determined by the motor. The speed of the motor may then be varied using the accelerator to vary the speed of the air engine (step 1020).

Known air engines use complex means to control the speed of the air engine, including multiple stages of compression and means such as accelerator valves for varying the air input to the engine. Varying air pressure and air flow to an air engine to control the speed of the air engine requires sophisticated and complex controls that add to the complexity and cost of an air engine. The air engine system 100 disclosed and claimed herein avoids complex means to control of the speed of the air engine by supplying a motor external to the air engine to set the speed of the air engine. Once the motor determines the speed of the air engine, the air can provide the power stroke to the air engine at that speed directly from the air tank without trying to vary the flow of the air into the engine to vary its speed. The result is the motor turns without taking a substantial amount of power from the power source because most of the power is supplied by the air engine. The combination of the air engine to supply the power and the motor to easily set the speed of the air engine results in an air engine system that allows easily varying the speed of the air engine using an accelerator that controls the speed of the motor coupled to the air engine. The motor has good low-end torque but has significantly less torque at higher speeds. The air engine, in contrast, has poor low-end torque but provides significant torque at higher speeds. Thus, using the motor to start the air engine and to control the speed of the air engine allows the motor to control the speed of the air engine while allowing the air engine to provide a majority of the work at normal operating speeds. Note also the motor acts as a starter for the air engine, eliminating the need for using a traditional starter.

Prototype

A prototype was built to test the design of the air engine system disclosed herein. A Golfkar golf cart was modified. The configuration of the air engine in the prototype is similar to that shown in FIG. 6. The engine on the golf cart was a Kohler K-181 series single cylinder 8 horsepower (hp) internal combustion engine. The camshaft was modified to remove the lobe that drive the intake valve, and to add an additional lobe for the exhaust valve. The result is the intake valve is always closed, as shown in FIG. 2, while the exhaust valve opens during every cycle of the piston. The air solenoid used was a Parker air solenoid, part number N3553904553 with a 24 volt coil, which is available from Parker Hannifin, 6035 Parkland Blvd, Cleveland, Ohio 44124. The air solenoid has one input and two outputs, with the unused output plugged. The air compressor used was an Oasis 24 volt DC air compressor, part number XD4000-24 that provides 10.1 cubic feet per minute (CFM) at 150 pounds per square inch (PSI). The DC motor is an Oasis 1.7 hp motor that runs on 24 volts. The air compressor and motor are available from Oasis Manufacturing, 23011 Alcalde Dr., Suite P, Laguna Hills, Calif. 92653. The speed controller is part number 174298.00 D09 with a 24 volt input manufactured by Leeson Electric Corporation, Grafton, Wis. 53024. The accelerator is a variable resistor (rheostat) that came with the speed controller with a variable resistance from 0 to 1K ohm, and was mounted below the seat so it could be easily turned by hand by the driver of the golf cart. The air tank is 25.5 inches by 14.75 inches by 5.5 inches, providing a total capacity of approximately 2,070 cubic inches. The batteries used are four deep-cycle batteries connected as shown in FIG. 9 to provide both 12 volt and 24 volt power. Because the air solenoid selected needs to be actuated by closing a circuit, and because the points are normally closed and open when the air solenoid needs to be actuated, custom points were designed and built to replace the factory points on the Kohler engine to be normally open, and to close when the air solenoid needs to be actuated.

When the prototype golf cart is operated, the air compressor is first activated to fill the air tank with compressed air to a pressure of 150 PSI. Once the air tank is pressurized to 150 PSI, the air compressor turns off until the air pressure falls to 100 PSI, which turns the compressor back on. A toggle switch supplies power to the speed controller. With the accelerator knob in the minimum position, the toggle switch is switched, which causes the speed controller to drive the motor to the minimum speed defined by the accelerator knob. Turning the air engine with the motor causes the points to close, which starts air flow through the engine. The air flow causes the engine to idle at the speed determined by the minimum speed of the motor. The variable resistor (accelerator) knob for the motor may be turned to set the speed of the motor, which directly controls the speed of the air engine. Once the air engine is running at a higher speed, the compressed air provides a majority of the power, while the motor idles at the desired speed without consuming a great deal of power from the batteries. The speed of the air engine can be easily changed by turning the knob of the variable resistor that acts as the accelerator. Turning the knob clockwise increases the speed of the motor and air engine, while turning the knob counterclockwise decreases the speed of the motor and air engine. The result is a very simple air engine system that provides simple and effective speed control and provides energy consumption that is significantly better than the 8 hp internal combustion engine. By providing a motor to control the speed of the air engine, the power of the air engine may be supplied by the simple system shown and described above without the need of varying the air flow or pressure of the compressed air to vary the speed of the air engine. The design is thus very simple and elegant, and produces very good performance at very low cost.

Measured Performance

The golf cart prototype was run at an ambient temperature of 53 degrees. The starting voltage of the batteries was 25.3 volts. The accelerator knob was set to its maximum value, which caused the motor to turn the air engine at approximately 2,700 revolutions per minute (RPM). The golf cart was run for 1 hour and 10 minutes before the batteries were discharged, at which time the batteries measured 24.3 volts. The air engine head temperature at the end of the test was 151 degrees Fahrenheit, and the air engine exhaust temperature was 107 degrees Fahrenheit.

A comparison is now possible with the golf cart using its internal combustion engine compared to the golf cart modified with the air engine system disclosed and claimed herein. An 8 hp single-cylinder engine under load consumes approximately 1 gallon of gasoline per hour. Assuming a price of $2.75 per gallon of gasoline, this means the fuel cost to power the golf cart using gasoline is approximately $2.75 per hour. For the prototype golf cart with the air engine system described above, the maximum motor current is 90 amps at 24 volts, and the maximum air compressor current is 90 amps at 24 volts. The result is a theoretical maximum of 180 amps at 24 volts, which produces a theoretical maximum power consumption of 180 amps times 24 volts, or 4,320 watts per hour. If we assume a high efficiency charger is used to recharge the batteries that has a charge efficiency of 85%, and if we assume battery efficiency of 90%, this means the total energy required to supply the 4,320 watts is (4,320/(0.85*0.90))=5,650 watts. At a cost of $0.10 per kilowatt hour, this means the energy required to power the air engine golf cart prototype is $0.57 per hour. Note this estimate is based on the theoretical maximum current draw of the air compressor and motor. During the test run, the air compressor cycled on and off, and was not on constantly. While the motor was being constantly driven to set the speed of the air engine, most of the power was supplied by the air engine drive shaft, so the current draw from the motor is estimated to be significantly less than the 90 amps maximum that is specified for the motor. But even assuming the maximum current draw by both the compressor and the motor, the golf cart still produces a cost that is 0.57/2.75, or 21% of the cost of operating the same engine in the same golf cart on gasoline. It is believed that further testing will reveal power input to the air engine system that is significantly less than the specified maximum, thereby further enhancing the efficiency of the air engine system. In addition, as the price of gasoline increases, the advantages of the air engine will be increasingly evident.

Vehicles

The air engine system disclosed and claimed herein can be used to power vehicles. Of course, things will necessarily scale up for engines with multiple cylinders. The number of batteries will necessarily increase, and the size of the motor, air compressor and air tank will also necessarily increase. But based on the test results obtained from the golf cart prototype, it is believed the concepts proven on the simple one cylinder prototype will scale well to engines with four, six or eight cylinders (or more). The result will be a vehicle that can run for a fraction of the energy cost of internal combustion engines, while burning no fossil fuel. The resultant air engine system thus provides an environmentally-friendly way to provide significant energy savings for operating a vehicle.

Because the air engine system disclosed herein is so much more efficient than internal combustion engines, a small internal combustion engine could be provided to charge the batteries to extend the range of a vehicle. Note, however, the size of the internal combustion engine needed to charge the vehicles is significantly smaller than the size of an internal combustion engine that normally powers the vehicle. Thus, it is expected that a large diesel engine that is used in commercial over-the-road truck tractors could be converted to run on compressed air as described above, and the addition of a small diesel engine to charge the batteries would then provide the range needed to run the truck for a suitable distance, while still providing significant fuel savings.

Another advantage of the air engine system is the lack of combustion, which means the life of the air engine should be significantly higher than for a similar internal combustion engine. The operating temperature of the air engine will be much less because there is no combustion. The engine oil in the prototype golf cart air engine was 10 weight oil, which should last significantly longer than oil in an internal combustion engine because there is no combustion to soil the oil.

While the discussion herein is in terms of an air engine, an air compressor, an air tank, etc., one skilled in the art will readily appreciate that any suitable gas could be used. The term "air" in the disclosure and claims herein expressly extend to any suitable gas that may be compressed, including without limitation air, nitrogen, oxygen, or other gasses. Air is the preferred compressed gas because it is plentiful and free.

While the specific examples discussed above are for piston engines, the disclosure and claims herein extend to any suitable type of engine, whether currently known or developed in the future. The air engine disclosed and claimed herein can include any suitable means for converting air pressure to energy to drive a drive shaft. In addition, while traditional internal combustion engines provide rotational energy in the form of a rotational crank shaft that drives a drive shaft, the air engine disclosed and claimed herein can also include other forms of mechanical work, including linear or elliptical movement.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   a power source;
   an air tank;
   an air compressor electrically coupled to the power source that provides compressed air to the air tank;
   an air engine that receives the compressed air from the air tank and introduces the compressed air into the air engine under control of a timing mechanism to provide power to a drive shaft;
   a motor mechanically coupled to the drive shaft, wherein speed of the motor determines speed of the drive shaft; and
   an accelerator coupled to the motor that controls speed of the motor.

2. The apparatus of claim 1 wherein the power source comprises at least one direct current (DC) battery.

3. The apparatus of claim 2 wherein the timing mechanism comprises points driven by mechanical control of the air engine.

4. The apparatus of claim 2 wherein the timing mechanism comprises an electronic timing mechanism driven by a sensor that detects state of the air engine.

5. The apparatus of claim 1 further comprising at least one air solenoid that provides the compressed air from the air tank into the air engine under control of the timing mechanism.

6. The apparatus of claim 1 further comprising a speed controller electrically coupled to the motor and the accelerator that receives input from the accelerator and in response determines speed of the motor.

7. A method for controlling an air engine, the method comprising the steps of:
(A) providing a power source;
(B) providing an air tank;
(C) providing an air compressor electrically coupled to the power source that provides compressed air to the air tank;
(D) providing the air engine that receives the compressed air from the air tank and introduces the compressed air into an intake of the air engine under control of a timing mechanism to provide power to a drive shaft;
(E) providing a motor mechanically coupled to the drive shaft;
(F) engaging the motor to set the speed of the drive shaft of the air engine, wherein the turning of the air engine by engaging the motor causes the timing mechanism to provide the compressed air from the air tank to the intake of the air engine, thereby causing the air engine to run; and
(G) varying the speed of the motor to vary the speed of the air engine.

8. The method of claim 7 further comprising the steps of:
providing a speed controller electrically coupled to the motor;
providing an accelerator electrically coupled to the speed controller that determines speed of the motor;
wherein step (G) is performed by varying the accelerator.

9. The method of claim 7 wherein the power source comprises at least one direct current (DC) battery.

10. The method of claim 7 wherein the timing mechanism drives at least one air solenoid to provide the compressed air from the air tank into the air engine.

11. The method of claim 10 wherein the timing mechanism comprises points driven by mechanical control of the air engine.

12. The method of claim 10 wherein the timing mechanism comprises an electronic timing mechanism driven by a sensor that detects state of the air engine.

13. A vehicle comprising:
a plurality of direct current (DC) batteries;
an air tank;
an air compressor electrically coupled to the plurality of DC batteries that provides compressed air to the air tank;
an air engine that receives the compressed air from the air tank and introduces the compressed air into the air engine under control of a timing mechanism to provide power to a drive shaft that provides a source of power to wheels of the vehicle;
a motor mechanically coupled to the drive shaft, wherein speed of the motor determines speed of the drive shaft;
a speed controller electrically coupled to the motor that determines speed of the motor; and
an accelerator coupled to the speed controller that determines speed of the motor.

* * * * *